(12) United States Patent
Bronars et al.

(10) Patent No.: US 12,406,352 B1
(45) Date of Patent: Sep. 2, 2025

(54) CABLE DAMAGE DETECTION BY MACHINE VISION

(71) Applicant: SCHLUMBERGER TECHNOLOGY CORPORATION, Sugar Land, TX (US)

(72) Inventors: Matthew Bronars, Atlanta, GA (US); Tianxiang Su, Arlington, MA (US); Suraj Kiran Raman, Cambridge, MA (US); Zhandos Ombayev, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/994,255

(22) PCT Filed: Jul. 14, 2023

(86) PCT No.: PCT/US2023/027707
§ 371 (c)(1),
(2) Date: Jan. 14, 2025

(87) PCT Pub. No.: WO2024/015545
PCT Pub. Date: Jan. 18, 2024

Related U.S. Application Data

(60) Provisional application No. 63/368,412, filed on Jul. 14, 2022.

(51) Int. Cl.
*G06T 7/00* (2017.01)
*G06V 10/26* (2022.01)
(Continued)

(52) U.S. Cl.
CPC .......... *G06T 7/0004* (2013.01); *G06V 10/273* (2022.01); *G06V 10/764* (2022.01);
(Continued)

(58) Field of Classification Search
CPC ......... G06T 7/0004; G06T 2207/20081; G06T 2207/20084; G06T 2207/30108; G06V 10/273; G06V 10/764; G06V 10/82
See application file for complete search history.

(56) References Cited

U.S. PATENT DOCUMENTS

| | | | |
|---|---|---|---|
| 2017/0057788 A1* | 3/2017 | Helenius | B66B 7/062 |
| 2018/0141787 A1* | 5/2018 | Rudy | B66C 15/06 |

(Continued)

OTHER PUBLICATIONS

International Search Report and Written Opinion of International Patent Application No. PCT/US2023/027707 dated on Oct. 27, 2023, 11 pages.

*Primary Examiner* — Ping Y Hsieh
(74) *Attorney, Agent, or Firm* — Jeffrey D. Frantz

(57) ABSTRACT

Systems and methods are disclosed herein for identifying cable damage using machine vision, such as on a cable being fed down a wellbore from a cable spool in an oil and gas operation. An example method can include providing a camera directed toward a cable that is winding upon, or unwinding from, a cable spool. The method can also include capturing a plurality of frames of images of the cable by the camera, such as by capturing video. The captured frames can be cropped to remove portions of the frames that do not include the cable. The method can further include processing the cropped frames using a machine-learning model. The machine-learning model can be trained using images of known cable damage as inputs so it can identify new instances of damage. The machine-learning model can further classify each cropped frame as including damage or not including damage.

16 Claims, 5 Drawing Sheets

(51) Int. Cl.
*G06V 10/764* (2022.01)
*G06V 10/82* (2022.01)

(52) U.S. Cl.
CPC .... *G06V 10/82* (2022.01); *G06T 2207/20081* (2013.01); *G06T 2207/20084* (2013.01); *G06T 2207/30108* (2013.01)

(56) References Cited

U.S. PATENT DOCUMENTS

| | | | |
|---|---|---|---|
| 2018/0305176 A1* | 10/2018 | Miyajima | G01S 17/58 |
| 2019/0063903 A1* | 2/2019 | Dou | G01N 21/88 |
| 2020/0122974 A1* | 4/2020 | Yang | B66B 5/0031 |
| 2020/0380658 A1* | 12/2020 | Yang | G06T 7/0002 |

* cited by examiner

CABLE DAMAGE DETECTION BY MACHINE VISION

CROSS-REFERENCE TO RELATED APPLICATION

This application is a National Stage Entry of International Application No. PCT/US2023/027707, filed on Jul. 14, 2023, which claims priority to U.S. Provisional Patent Application No. 63/368,412, filed on Jul. 14, 2022, which is incorporated by reference herein.

BACKGROUND

The present disclosure is related in general to detecting cable damage using machine vision, such as at an oilfield wellsite.

In some oilfield and hydrocarbon related operations, tools can be advanced into a wellbore on a wireline cable to perform various operations, such as drilling, milling, and cutting, to name just a few examples. Cables can become damaged over time, such as the exterior armor of the cable fraying or peeling away. Eventually, this damage can lead to failures. Cable failures historically have a catastrophic footprint. Regardless of which portion of the cable breaks, a failure can lead to hundreds of hours of non-productive time at the wellsite. Tools can be damaged or become stuck within the wellbore as a result. Worst of all, human operators can be injured or even killed due to a cable failure.

To avoid these catastrophic problems, cable damage needs to be detected as early as possible. But existing solutions do not reliably detect cable damage. Typically, an operator must actively watch a cable unwind from a cable spool in order to catch any damage. But this method is severely lacking for several reasons. For example, a human operator is not capable of giving undivided attention to a single item like cable damage for an extended period of time without breaks or interruptions. Further, human eyes can fail to see damage if the cable speed is too high, conditions are not ideal (such as rain, snow, darkness, or dirt on the cable). In addition, staffing a human operator to do nothing but watch for cable damage is a waste of resources, as that operator could be performing tasks directly related to oil and gas extraction. In other words, a human simply cannot accurately perform this task, and even if they could, it would not be economical to do so.

As a result, a need exists for new and improved methods of detecting cable damage. It is against this backdrop that the disclosed embodiments are described herein.

SUMMARY

Systems and methods are disclosed herein for identifying cable damage using machine vision, such as on a cable being fed down a wellbore from a cable spool in an oil and gas operation. An example method can include providing a camera directed toward a cable that is winding upon, or unwinding from, a cable spool. In some examples, multiple cameras are used and are directed to the same portion of the cable, such as from different angles. One or more lights can also be used to illuminate the relevant portion of the cable. The method can include capturing a plurality of frames of images of the cable by the camera, such as by capturing video. The captured frames can be transmitted to a processing device, also referred to herein as a controller, for further processing. Where multiple cameras are used, each frame can be associated with a timestamp such that the controller can identify corresponding frames from the different cameras.

The controller can crop the captured frames to remove portions of the frames that do not include the cable. For example, the frames can be cropped by a region-of-interest ("ROI") extractor that includes at least one of a cascade classifying module, an edge detection module, and an object tracking module. The controller can then process the cropped frames by utilizing a machine-learning model, where the cropped frames are used as inputs. The machine-learning model can be trained at a remote server using images of known cable damage as training inputs so it can identify new instances of damage. At the worksite, the controller can utilize the machine-learning model to classify each cropped frame as including damage or not including damage. The machine-learning model can utilize a convolutional neural network to perform the classification in some examples.

In response to determining that a cropped frame (or a series of cropped frames) includes damage, the controller can generate an alert. The alert can cause the cable spool to stop, such as by cutting power to a winch that operates the cable spool. The alert can also cause a notification to be delivered to a display device, such as a phone or tablet utilized by an operator at the worksite. In some examples, the operator can respond to the notification by stopping or start the winch, or by confirming the condition of the cable after a manual inspection.

Additionally, example systems are disclosed that can perform the methods disclosed herein. An example system can include the cable spool with a cable at least partially wound around the cable spool. It can also include one or more cameras directed to a portion of the cable that is not in contact with the cable spool, for capturing frames of images. The system can also include a controller or processing device that performs various stages of the method, such as cropping the frames to remove portions of the frames that do not include the cable, processing the cropped frames using the machine-learning model, and classifying each cropped frame as including damage or not including damage.

An example non-transitory, computer-readable medium is also described. The medium can include instructions that, when executed by a hardware-based processor of a computing device such as the controller or processing device, performs various stages. The stages can include receiving a plurality of frames of images from a camera directed toward a cable that is winding upon, or unwinding from, a cable spool, cropping the frames to remove portions of the frames that do not include the cable, processing the cropped frames using a machine-learning model, and classifying each cropped frame as including damage or not including damage.

This summary section is not intended to give a full description of the disclosed systems and methods.

BRIEF DESCRIPTION OF THE DRAWINGS

The embodiments of the present invention are illustrated by way of example, and not by way of limitation, in the figures of the accompanying drawings and in which like reference numerals refer to similar elements. The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
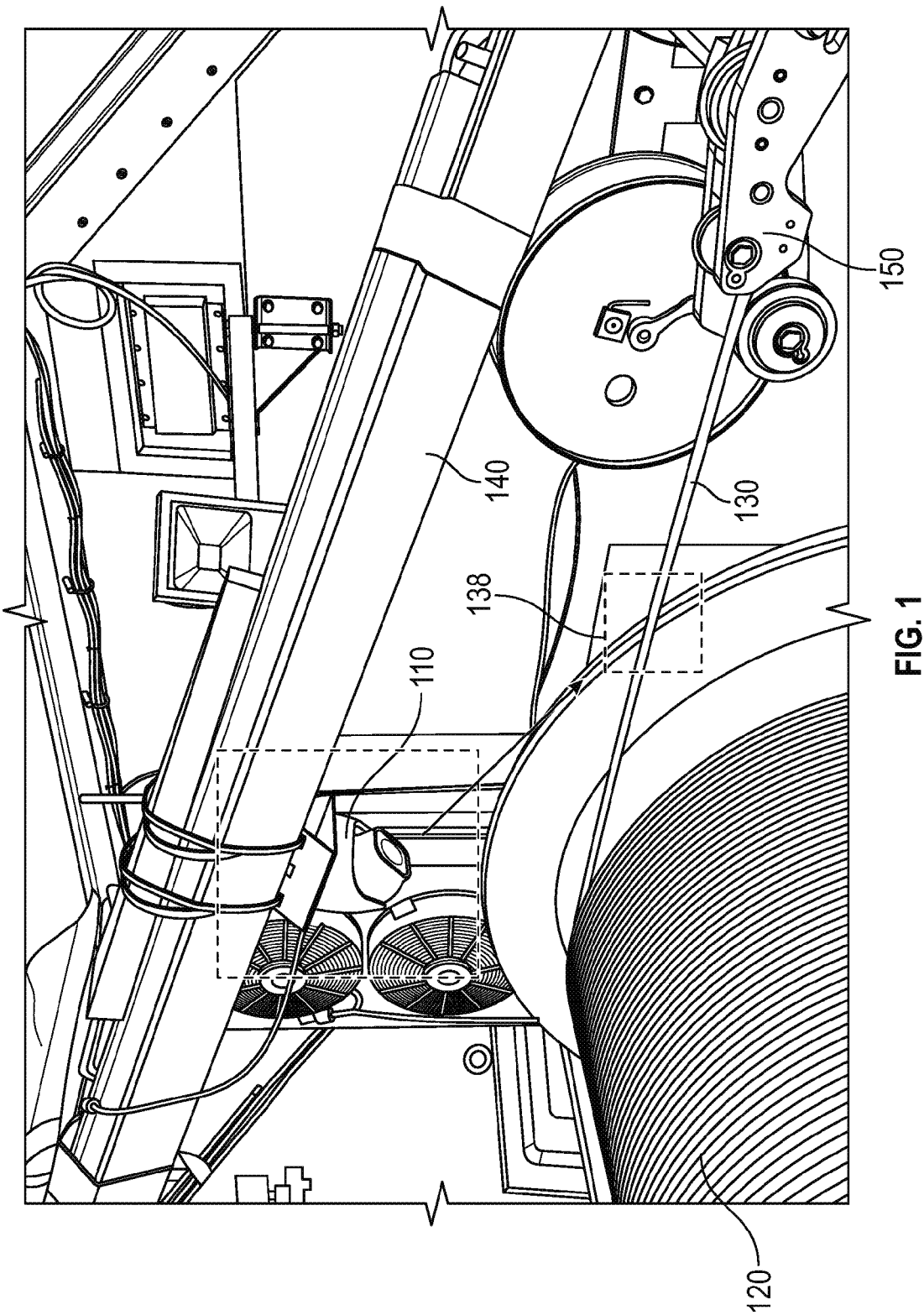
FIG. 1 provides an annotated illustration of a portion of an example system for identifying cable damage using machine vision.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact and may also include embodiments in which additional features may be formed interposing the first and second features, such that the first and second features may not be in direct contact.

FIG. 1 shows elements of an example system for identifying cable damage using machine vision. The drawing includes a cable 130 partially wound around a cable spool 120. The cable 130 can be wound on or off the cable spool 120 by rotating the spool 120, such as by operating a winch device. As shown in FIG. 1, the system can include a camera 110 mounted in a nearby location. In some examples, the camera 110 is mounted to a portion of a frame 140 associated with the cable spool 120. The frame 140 can be a frame that supports the cable spool 120 itself, or it can be a frame that does not support the cable spool 120 but remains in a fixed position relative to the cable spool 120. For example, the frame 140 can be a portion of a truck that carries the cable spool 120 or a frame 140 of an adjoining structure.

The camera 110, which is also depicted with an annotated box, can be configured to record images or video of the cable 130 at a region of interest ("ROI") 138. The ROI 138 is depicted in FIG. 1 with an annotated box as well. The camera 110 need not capture only the ROI 138—in other words, the field of view of the camera can encompass other elements, as long as it includes the ROI 138. In this example, the ROI 138 is a portion of the cable 130 between the cable spool 120 and a pulley set 150 through which the cable 130 runs.

In some examples, the camera 110 is controlled such that it automatically adjusts its direction to include the ROI 138. For example, as the cable 130 is pulled from the cable spool 120, the cable 130 can extend from different locations on the cable spool 120 based on how the cable 130 is wrapped around the spool 120 Generally, the cable 130 will move laterally over time, from side to side, assuming the cable 130 is wrapped in standard fashion around the cable spool 120. The pulley set 150 can follow this side to side movement. In some examples, a controller (not shown) provides input to the camera 120 to cause it to move with the cable 130. In another examples, the camera 120 uses a wide view that includes all potential locations of the ROI 138 of the cable 130.

Although only one camera 110 is shown, any number of cameras 110 can be used. In some examples, multiple cameras 110 are mounted to the frame 140 or another relatively static location, with all of those cameras 110 configured to capture images or video of the ROI 138 of the cable 130.

The camera 110 can send captured images or videos to a controller or processing device, which is not shown in the drawing. The controller or processing device can be located on site, or remotely such as on a remote server or a cloud service. The controller can perform various tasks using the capture images or videos. For example, the images or videos can be structures as multiple frames. Each frame can be timestamped. The controller can operate on every single frame, or it can select frames periodically, such as ten frames per second, every other frame, or some other combination. The controller can crop each selected frame to remove portions of the frame that do not include the cable 130. For example, if the camera 110 is set with a view wide enough to capture the cable 130 as it unwinds without panning the camera 110 from side to side, then the captured frames may include large areas of the frame that do not include the cable 130. The frames can be cropped to focus particularly on the ROI 138.

The controller can then process the cropped frames using a machine-learning model. The model can accept inputs and calculate outputs in accordance with the underlying model. In this example, the model can accept the cropped frames as input, and then output a classification of each of those cropped frames. For example, the output can be a classification of a cropped frame as either including cable 130 damage or not including cable 130 damage. This can be noted with a binary flag, such as "0" or "1," or "yes" or "no"

The machine-learning model can be trained using pre-classified images. For example, a user can provide an image that is confirmed to show cable damage, including as input an indication that the image shows damage. Similarly, the user can provide an image that is confirmed to show no cable damage, including as input an indication that the image shows no damage. Although the term "no damage" is used herein, the classification can indicate damage above or below a certain threshold. That is, a cable 130 can include a small amount of damage that falls below the damage threshold, but that portion of the cable 130 can still be classified as "no damage." This process can be repeated with many pre-classified images as inputs. The machine-learning model can leverage a convolutional neural network to learn based on the inputs, as well as to perform classifications in the field.

Figure 2:
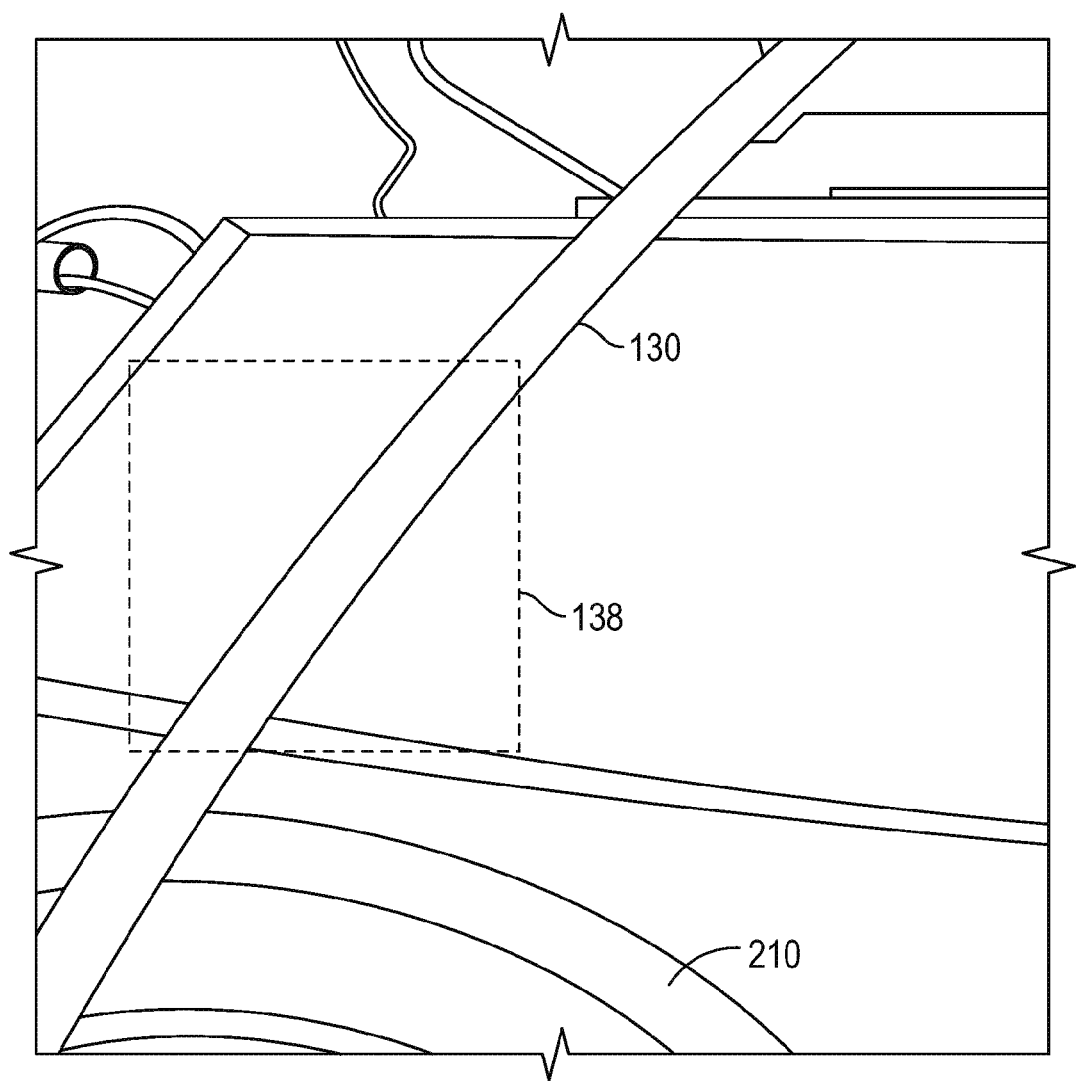
FIG. 2 provides an annotated illustration of a cropped frame showing no cable damage at the region of interest.

FIG. 2 provides an annotated illustration of a cropped frame showing no cable damage at the ROI 138 of the cable 130. Continuing the previous discussion, the machine-learning model can classify the cropped frame of FIG. 2 as "no damage." In some examples, the controller can update a display device to indicate that no damage is currently detected. For example, a graphical user interface ("GUI") of a display device, such as a phone or tablet, can include a message 210 or visual indication, such as a green color, to indicate to a user that no damage is currently detected.

Figure 3:
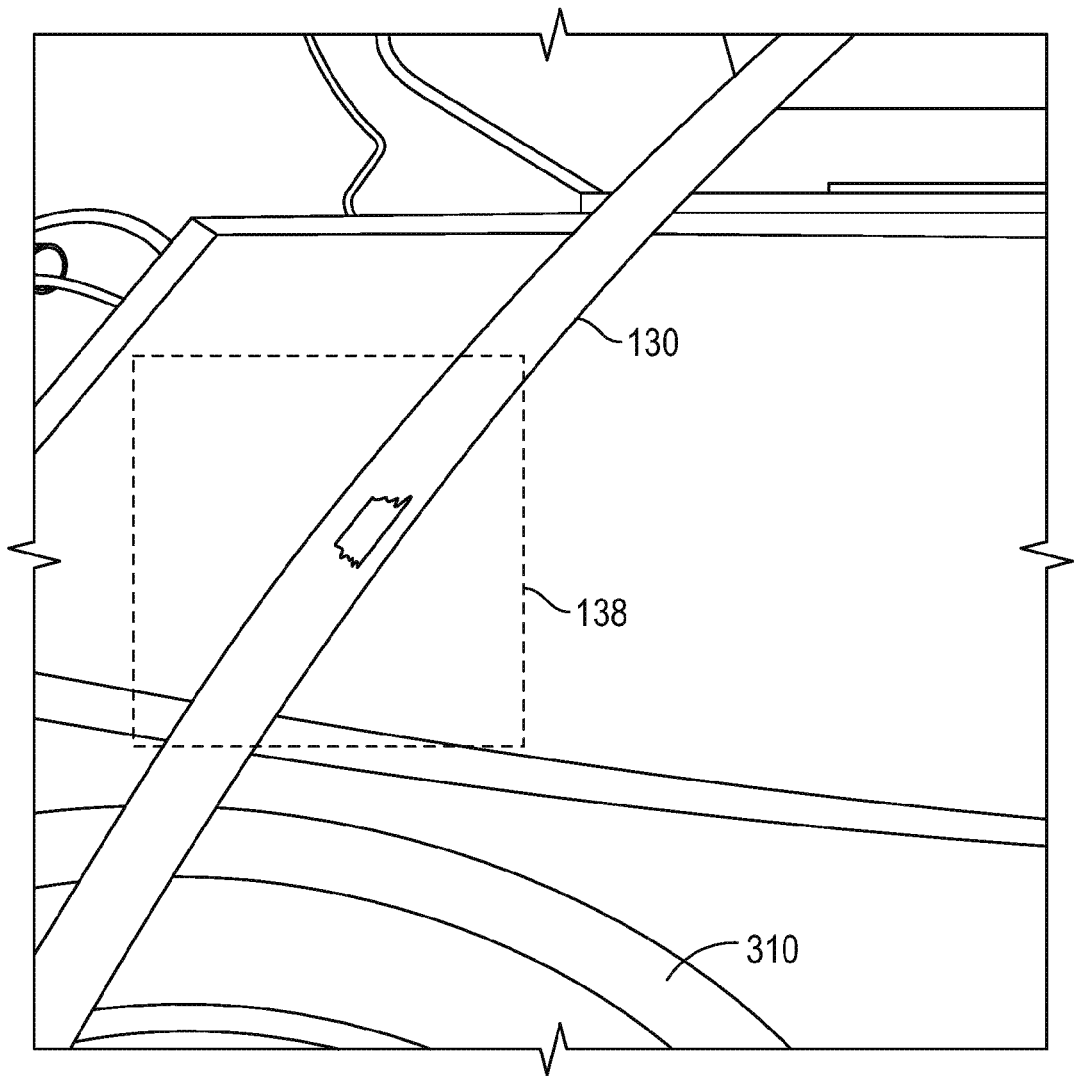
FIG. 3 provides an annotated illustration of a cropped frame showing cable damage at the region of interest.

FIG. 3, on the other hand, provides an annotated illustration of a cropped frame showing cable damage at the region of interest 138 of the cable. In this example, the machine-learning model classifies the cropped frame of FIG. 3 as "damage detected." This can cause the controller to update a display device to indicate that damage is detected. For example, a GUI of a display device can include a notification 310 or visual indication, such as a red color, to indicate to a user that damage is currently detected.

In some examples, the controller can generate an alert based on detecting damage. The alert can then cause various other actions to be taken. In one example, an alert generates a notification that can be displayed on the display device. In another example, the alert causes the controller to stop the cable 130, such as by cutting power to a winch that winds or unwinds the cable spool 120. The alert can also cause the controller to send one or more cropped images to the display device, showing the images that resulted in the detection. The controller can also identify a particular time or an estimated location of the cable 130 that includes the damage, in case an operator needs to reverse the cable 130 direction to find the damaged portion of the cable 130.

Figure 4:
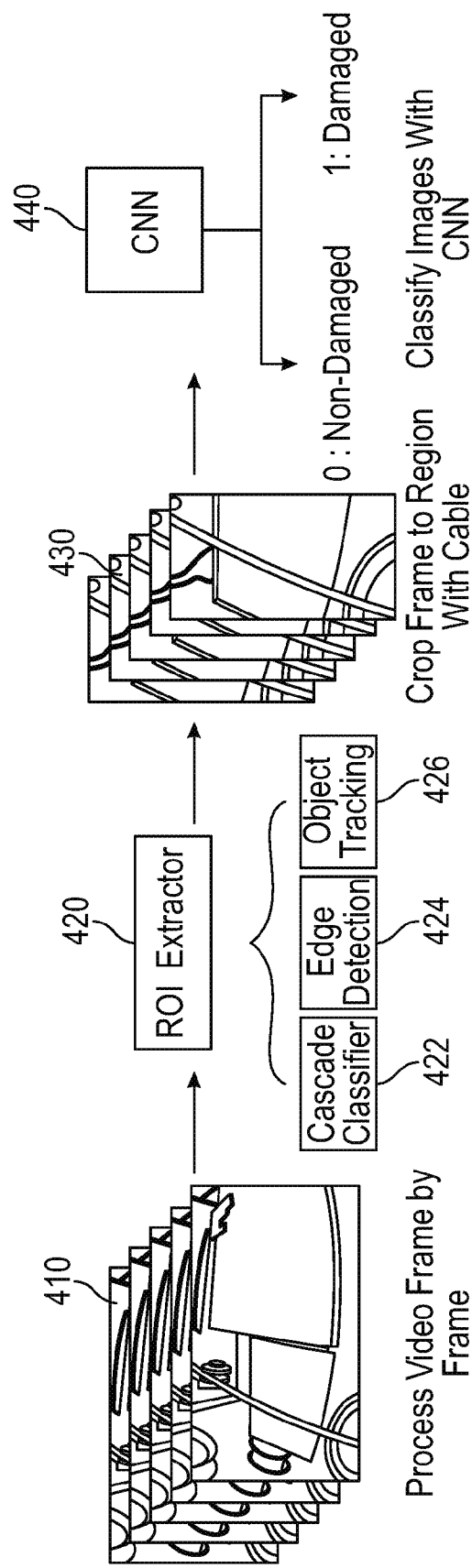
FIG. 4 provides a diagram of an example method for processing frames of images to identify cable damage.

FIG. 4 provides a diagram of an example method for processing frames of images to identify cable damage. These stages can be carried out by a controller for example. At stage 410, the controller can process video received from one or more cameras 110. For example, a video feed can be provided as a series of frames of images. The controller can select all of the frames of images, or some portion of them, such as every other frame or a random 10 frames per second of operation. The selected frames can be analyzed by an ROI extractor 420, which can be a software module executing on the controller. In some examples, the ROI extractor 420 executes elsewhere, such as on a server that includes greater compute power relative to the controller. Although this disclosure refers to the controller itself as performing certain steps, those steps are understood to encompass a scenario where the controller causes another device to perform the step.

The ROI extractor 420 can include several modules, including a cascade classifier module 422, an edge detection module 424, and an object tracking module 426. The cascade classifier module 422 can be trained with various sample views of cables such that it learns to identify a cable 130. After the cascade classifier module 422 is trained, it can be applied to a region of an image and detect whether the view includes cable damage or not.

To focus the cascade classifier module 422 on the appropriate portion of an image, an edge detection module 424 can detect edges that make up a cable 130, which an object tracking module 426 tracks changes between the previous image and current image, helping to detect the portion that has moved in the time elapsed between the two images. These modules 422, 424, 426, which can be software modules executing in the controller, collectively form the ROI extractor 420. The ROI extractor 420 can identify a region of interest in an image and, at stage 430, crop the frame of the image to match that region.

The cropped frames can then be further analyzed at stage 440. For example, stage 440 can include utilizing a convoluted neural network that has been previously trained. The neural network can be trained using two groups of inputs. The first group can include frames that show damaged cables, while the second group includes frames that show undamaged cables (or at least, cables with damage that does not rise above an arbitrary damage threshold). The neural network leveraged by the controller can make a binary classification for each cropped frame—in this example, either "0" to indicate a non-damaged cable 130, or "1" to indicate a damaged cable 130. The controller can then take further steps based on this classification, as explained elsewhere in this disclosure.

Figure 5:
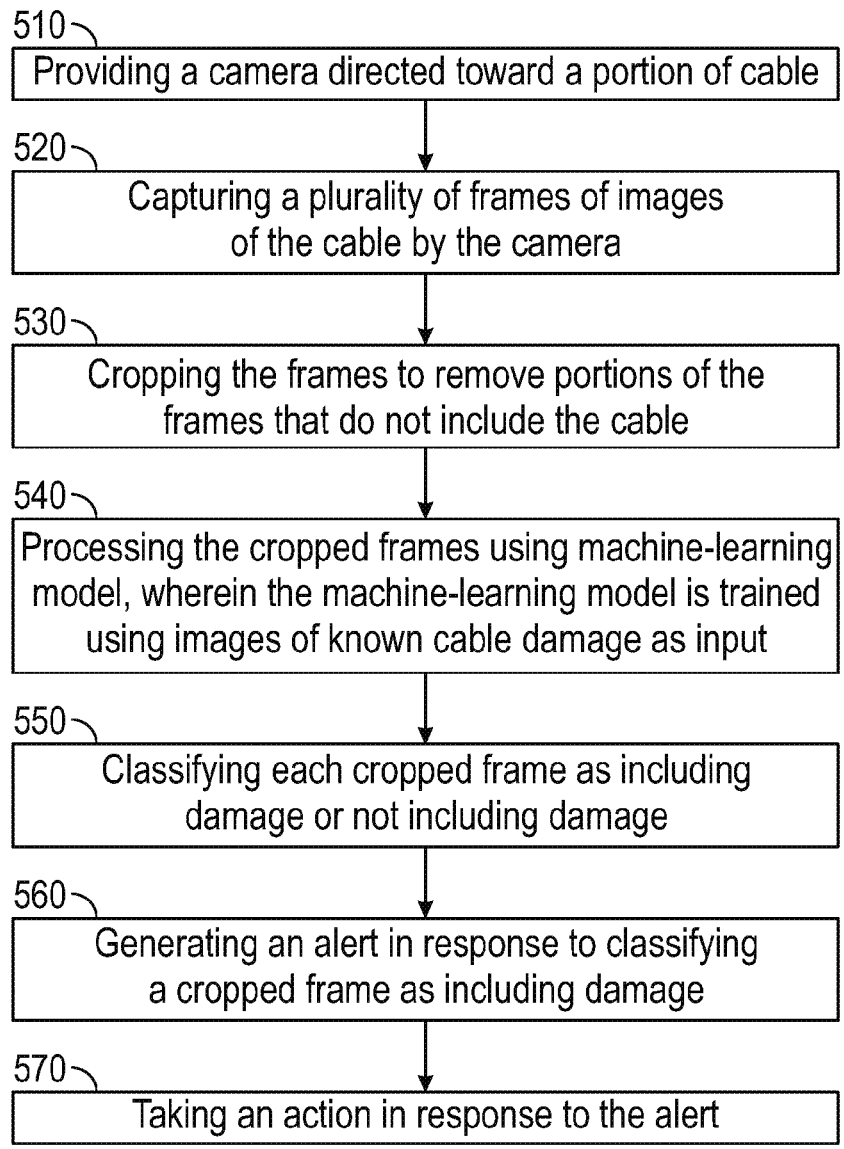
FIG. 5 provides a flowchart of an example method for identifying cable damage using machine vision.

FIG. 5 provides a flowchart of an example method for identifying cable damage using machine vision. At stage 510, a camera 110 can be directed toward a portion of a cable 130. For example, the camera 110 can be directed toward a ROI 138 of the cable 130 as shown in FIG. 1. At stage 520, the camera 110 can capture multiple frames of images of the cable 130. At stage 530, a controller can crop the frames to remove portions of the frames that do not include the relevant portion of the cable 130, such as by using the methods described with respect to FIG. 4 above.

At stage 540, the controller can process the cropped frames using a machine-learning model that has been trained using images of known cable damage as inputs. This processing can result in a classification at stage 550 of each cropped frame as either including damage or not including damage.

At stage 560, the controller can generate an alert in response to classifying a cropped frame as including damage. The alert can then cause various other actions to be taken at stage 570. In one example, an alert generates a notification that can be displayed on the display device. In another example, the alert causes the controller to stop the cable 130, such as by cutting power to a winch that winds or unwinds the cable spool 120. The alert can also cause the controller to send one or more cropped images to the display device, showing the images that resulted in the detection. The controller can also identify a particular time or an estimated location of the cable 130 that includes the damage, in case an operator needs to reverse the cable 130 direction to find the damaged portion of the cable 130

The preceding description has been presented with reference to present embodiments. Persons skilled in the art and technology to which this disclosure pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims.

What is claimed is:

1. A method for identifying cable damage using machine vision, comprising:
   providing a camera directed toward a cable that is winding upon, or unwinding from, a cable spool;
   capturing a plurality of frames of images of the cable by the camera;
   cropping the frames by a region-of-interest ("ROI") extractor to remove portions of the frames that do not include the cable;
   processing the cropped frames using a machine-learning model, wherein the machine-learning model is trained using images of known cable damage as inputs; and
   classifying each cropped frame as including damage or not including damage.

2. The method of claim 1, further comprising, generating an alert in response to classifying a cropped frame as including damage.

3. The method of claim 2, wherein the alert causes the cable spool to stop.

4. The method of claim 2, wherein the alert generates a notification on a display device.

5. The method of claim 1, wherein the machine-learning model utilizes a convolutional neural network to perform the classification.

6. The method of claim 1, wherein the ROI extractor includes at least one of a cascade classifying module, an edge detection module, and an object tracking module.

7. The method of claim 1, wherein the machine-learning model is trained at a server remote from the cable.

8. The method of claim 1, further comprising providing a plurality of cameras directed toward a same portion of the cable.

9. A system for identifying cable damage using machine vision, comprising:
- a cable spool including a cable at least partially wound around the cable spool;
- a camera directed to a portion of the cable that is not in contact with the cable spool, wherein the camera captures a plurality of frames of images of the portion of the cable;
- a processing device that performs stages including:
- cropping the frames by a region-of-interest ("ROI" extractor) to remove portions of the frames that do not include the cable;
- processing the cropped frames using a machine-learning model, wherein the machine-learning model is trained using images of known cable damage as inputs; and
- classifying each cropped frame as including damage or not including damage.

10. The system of claim 9, the stages further comprising generating an alert in response to classifying a cropped frame as including damage.

11. The system of claim 10, wherein the alert causes the cable spool to stop.

12. The system of claim 10, wherein the alert generates a notification on a display device.

13. The system of claim 9, wherein the machine-learning model utilizes a convolutional neural network to perform the classification.

14. The system of claim 9, wherein the ROI extractor includes at least one of a cascade classifying module, an edge detection module, and an object tracking module.

15. The system of claim 9, wherein the machine-learning model is trained at a server remote from the cable.

16. The system of claim 9, the stages further comprising providing a plurality of cameras directed toward a same portion of the cable.

* * * * *